United States Patent
Weldon et al.

(10) Patent No.: US 6,941,934 B2
(45) Date of Patent: Sep. 13, 2005

(54) PURGE VALVE INCLUDING AN ANNULAR PERMANENT MAGNET LINEAR ACTUATOR

(75) Inventors: Craig Andrew Weldon, Chatham (CA); Corey Tatsu, Chatham (CA); Dale Zdravkovic, Mississauga (CA); Russell Modien, Chatham (CA); Giles R. Amirault, Lower West Pubnico (CA)

(73) Assignee: Siemens VDO Automotive Inc., Chatham, CA (US)

( * ) Notice: Subject to any disclaimer, the term of this patent is extended or adjusted under 35 U.S.C. 154(b) by 0 days.

(21) Appl. No.: 10/871,525

(22) Filed: Jun. 21, 2004

(65) Prior Publication Data

US 2005/0051143 A1 Mar. 10, 2005

Related U.S. Application Data

(60) Provisional application No. 60/480,425, filed on Jun. 20, 2003.

(51) Int. Cl.[7] ............................. F16K 31/02; H01H 9/00
(52) U.S. Cl. ................... 123/520; 251/129.15; 335/205
(58) Field of Search ................................. 123/516, 518, 123/519, 520; 251/65, 129.15, 129.22; 335/205, 206

(56) References Cited

U.S. PATENT DOCUMENTS

| | | | |
|---|---|---|---|
| 4,220,899 A | * | 9/1980 | von der Heide ............ 318/135 |
| 4,899,996 A | * | 2/1990 | Maassen et al. ....... 267/140.14 |
| 5,166,563 A | | 11/1992 | Bassine |
| 5,208,570 A | | 5/1993 | Nippert |
| 5,265,842 A | | 11/1993 | Sorah et al. ........... 251/129.08 |
| 5,800,336 A | | 9/1998 | Ball et al. |
| 6,000,417 A | | 12/1999 | Jacobs |
| 6,092,545 A | | 7/2000 | Bedore et al. |
| 6,247,456 B1 | * | 6/2001 | Everingham et al. ....... 123/520 |
| 6,279,574 B1 | | 8/2001 | Richardson et al. |
| 6,424,244 B1 | * | 7/2002 | Hendel ........................ 335/177 |
| 6,526,951 B2 | | 3/2003 | Ishigaki et al. |
| 6,581,904 B2 | | 6/2003 | Watanabe et al. |
| 2001/0017160 A1 | | 8/2001 | Ishigaki et al. ............. 137/520 |
| 2002/0104979 A1 | | 8/2002 | Kato |
| 2003/0102446 A1 | | 6/2003 | Krimmer et al. ............. 251/50 |
| 2004/0040547 A1 | * | 3/2004 | Ivens et al. ................. 123/520 |
| 2004/0255916 A1 | * | 12/2004 | Ivens et al. ................. 123/520 |

* cited by examiner

Primary Examiner—Thomas Moulis

(57) ABSTRACT

A purge valve includes an aperture, a member, and an actuator. The aperture defines a portion of a vapor flow path that extends between a first port that communicates vapor with a fuel vapor collection canister and a second port that communicates vapor with an intake manifold. The member is displaced with respect to the aperture between a first configuration wherein the member occludes the aperture and a second configuration that permits vapor flow along the vapor flow path. The actuator displaces the member between the first and second configurations and includes an armature and a stator. The stator includes a winding that extends along an axis. And the armature, which is coupled to the member, surrounds the winding and includes a permanent magnet.

17 Claims, 5 Drawing Sheets

US 6,941,934 B2

PURGE VALVE INCLUDING AN ANNULAR PERMANENT MAGNET LINEAR ACTUATOR

CROSS REFERENCE TO RELATED APPLICATIONS

This application claims the benefit of the earlier filing date of U.S. Provisional Application No. 60/480,425, filed 20 Jun. 2003, which is incorporated by reference herein in its entirety.

Related co-pending applications filed concurrently herewith are identified as "Purge Valve and Method of Purging Using a Permanent Magnet Linear Actuator" and "Purge Valve Including a Dual Coil Permanent Magnet Linear Actuator", each of which are incorporated by reference herein in their entirety.

FIELD OF THE INVENTION

This invention is germane to devices including linear actuators. This invention relates generally to on-board emission control systems for internal combustion engine powered motor vehicles, e.g., evaporative emission control systems, and more particularly to a fuel vapor canister purge solenoid valve in an evaporative emission control system.

BACKGROUND OF THE INVENTION

A known on-board evaporative emission control system includes a canister that collects fuel vapor emitted from a fuel tank containing a volatile liquid fuel for the engine. As the canister collects fuel vapor, the canister progressively becomes more saturated with the fuel vapor. During engine operation, vacuum from the engine intake manifold induces atmospheric airflow through the canister, and draws the collected fuel vapor into the engine intake manifold for consumption in the combustion process. This process is commonly referred to as "purging" the fuel vapor collection canister, and is controlled by a canister purge solenoid valve in response to a purge control signal generated by an engine management system.

SUMMARY OF THE INVENTION

The present invention provides a purge valve for a fuel system that includes an intake manifold of an internal combustion engine and a fuel tank in vapor communication with a fuel vapor collection canister. The purge valve includes an aperture, a member, and an actuator. The aperture defines a portion of a vapor flow path that extends between first and second ports. The first port communicates vapor with the fuel vapor collection canister, and the second port communicates vapor with the intake manifold. The member is displaced between first and second configurations with respect to the aperture. The member in the first configuration occludes the aperture and vapor flow along the vapor flow path is substantially prevented. The member in the second configuration is spaced from the aperture and vapor flow along the vapor flow path is permitted. The actuator displaces the member between the first and second configurations. The actuator includes an armature and a stator. The stator includes a winding that extends along an axis. The armature is coupled to the member and is displaced along the axis. And the armature surrounds the winding and includes a permanent magnet.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
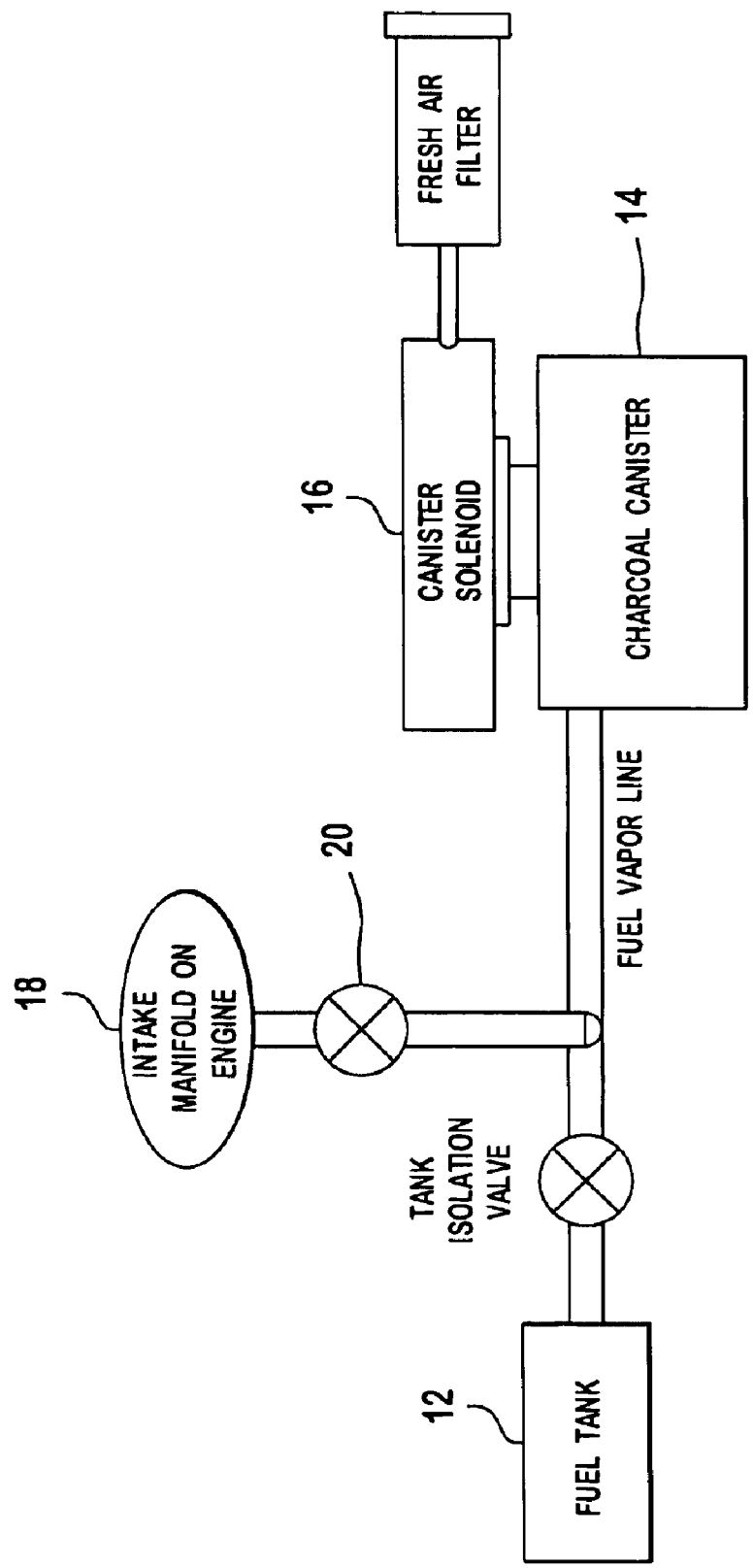
FIG. 1 is a schematic illustration of a fuel system that includes a fuel vapor canister purge valve in accordance with the detailed description of the preferred embodiment.

Referring to FIG. 1, a fuel system 10, e.g., for an engine (not shown), includes a fuel tank 12, a fuel vapor collection canister 14 (e.g., a charcoal canister), a canister solenoid valve 16, a vacuum source 18 such as an intake manifold of the engine, and a purge valve 20.

Hydrocarbon fuel vapors from the fuel tank 12 flow through a fuel vapor line connecting the fuel tank 12 and the fuel vapor collection canister 14. These fuel vapors are stored in the fuel vapor collection canister 14, which includes a storage medium, e.g., charcoal, that has a natural affinity for hydrocarbons. During engine operation, the intake manifold vacuum source 18 draws atmospheric air through the canister, via the canister solenoid valve 16, where the air picks up hydrocarbon vapors. These vapors then enter the engine intake manifold where they combine with the fuel-air mixture and are burnt in the engine.

So that the effect on the fuel-air mixture of the additional hydrocarbon vapors can be managed, it is important for a purge valve to precisely meter the fuel vapor flow, and thus it is desirable for the purge valve 20 to respond in a linear manner to control signals from an engine management computer. Thus, it is desirable that an actuator for the purge valve provides a linear relationship between the force it produces and its range of movement. Moreover, it is desirable that the magnitudes of the force and range of the actuator be sufficient for different control signals. An actuator for the purge valve 12 provides a force that allows for a stronger return spring opposing movement of the actuator, and thus provides improved leak resistance when the purge valve 12 is closed and provides improved positional stability during purging. And the range of the actuator provides increased sensitivity to the control signal, and thus provides accurate purging.

Figure 2:
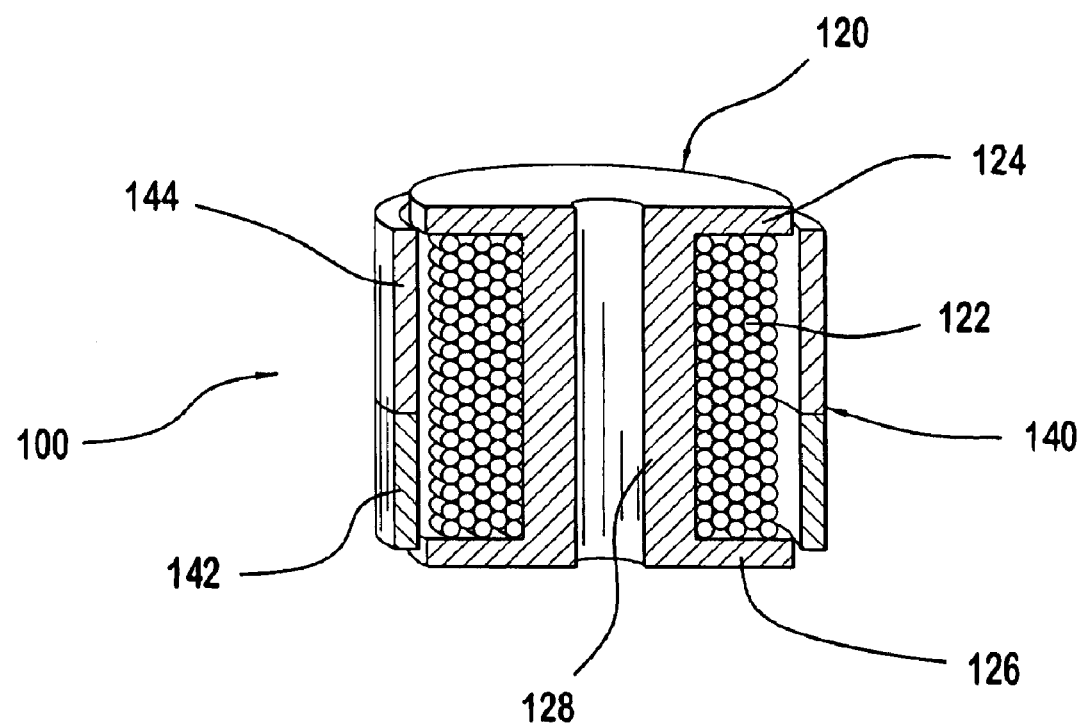
FIG. 2 is a cross-sectional view of an actuator for the fuel vapor canister purge valve illustrated in FIG. 1.

Referring now to FIG. 2, there is shown an example of an actuator 100 that includes a stator 120 and an armature 140. The stator 120 includes a winding 122 that is supplied electricity so as to produce magnetic flux. A magnetic circuit for the flux includes a top washer 124, a bottom washer 126, and a tube 128. The top washer 124, the bottom washer 126, and the tube 128 are made of a ferrous material, e.g., steel. The washers 124,126, which may be arranged as flanges on the tube 128, act as pole pieces that concentrate the magnetic flux, and the tube 128 completes a magnetic circuit that also includes the armature 140.

Figure 3:
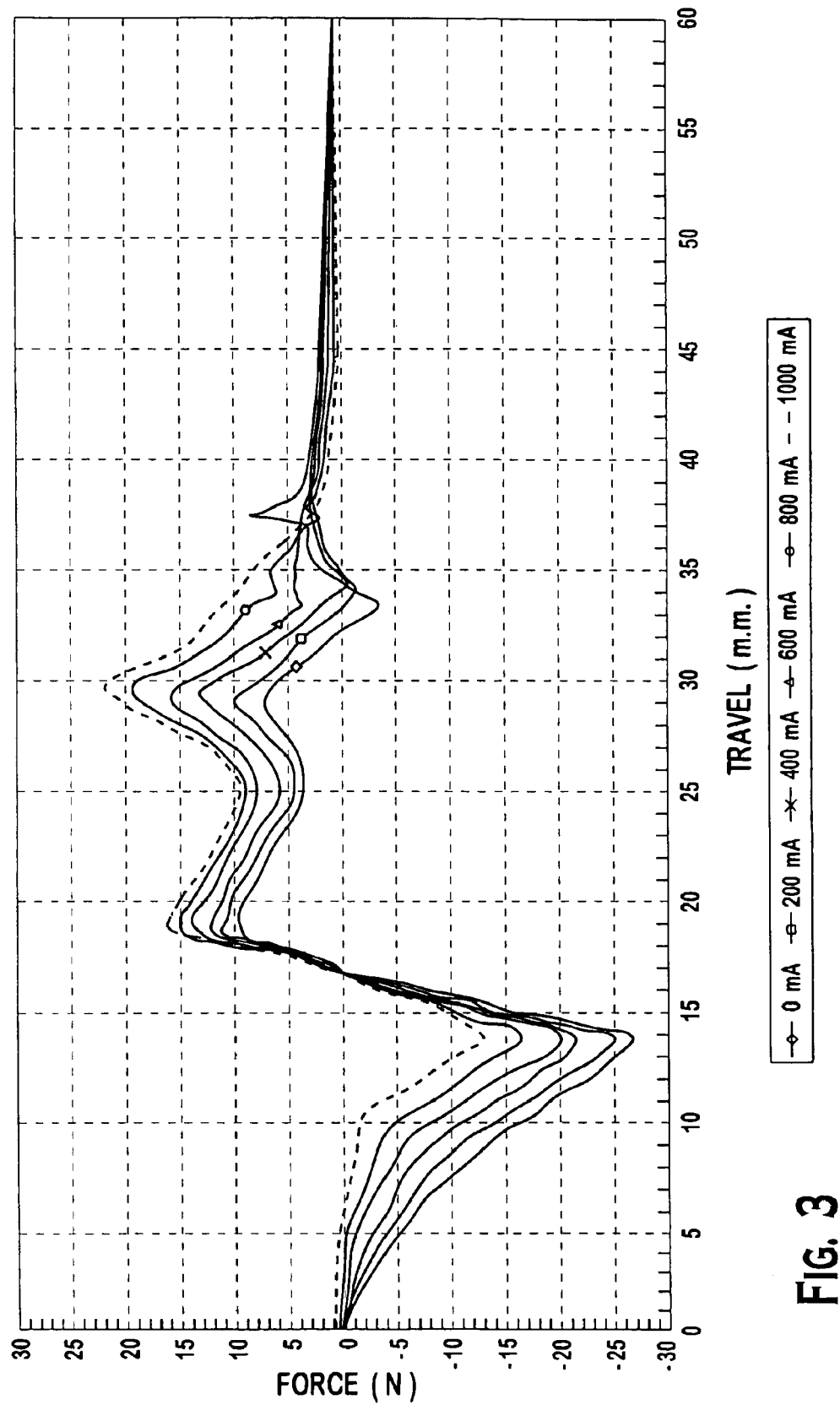
FIG. 3 is a graph illustrating the relationship between actuator force and armature displacement for the actuator shown in FIG. 2.

Preferably, the armature 140 includes a permanent magnet 142 and an armature piece 144. The permanent magnet 142 is preferably a rare earth magnet, such as a composition of neodymium, iron and boron that is made by a powder metallurgy process that results, after magnetic alignment and sintering, in oriented metal magnets exhibiting >99% of theoretical density. A sintered construction permits complex geometries while minimizing cost and without sacrificing magnetic strength. Preferably, the permanent magnet 142 has an energy product of at least approximately 32 Mega Gauss Oersted (MGOe), which is believed to provide a suitable balance between cost and energy products. Additional characteristics, such as operating temperature, can be provided by adjusting the metallurgy of the permanent magnet 142. The armature piece 144 is made of a ferrous material, e.g., steel. The stator 120 and armature 140, as shown in FIG. 2, may provide force versus travel characteristics as illustrated by the constant current traces shown in FIG. 3.

Figure 4:
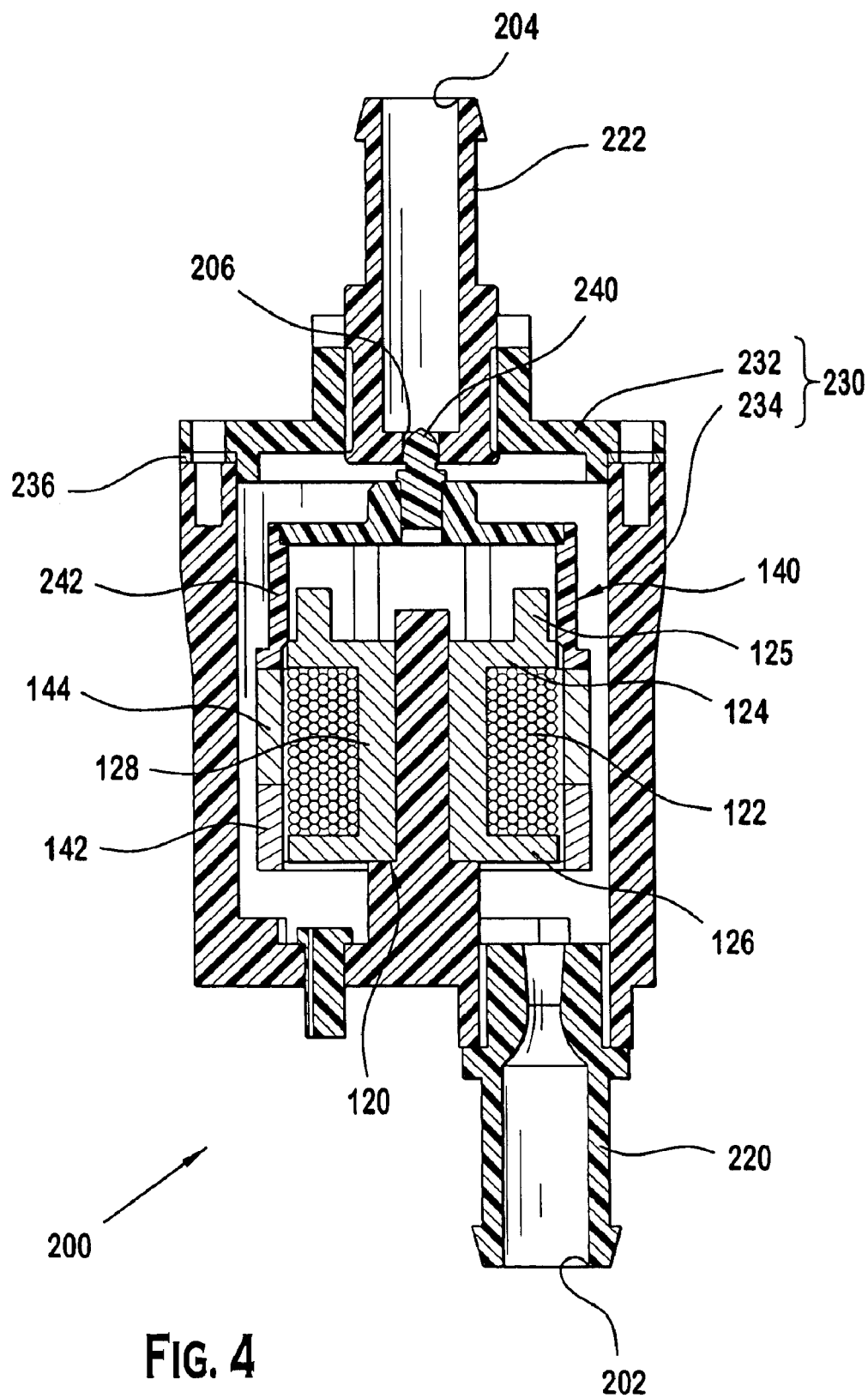
FIG. 4 is a cross sectional view of a closed configuration for a preferred embodiment of the fuel vapor canister purge valve illustrated in FIG. 1.
Figure 5:
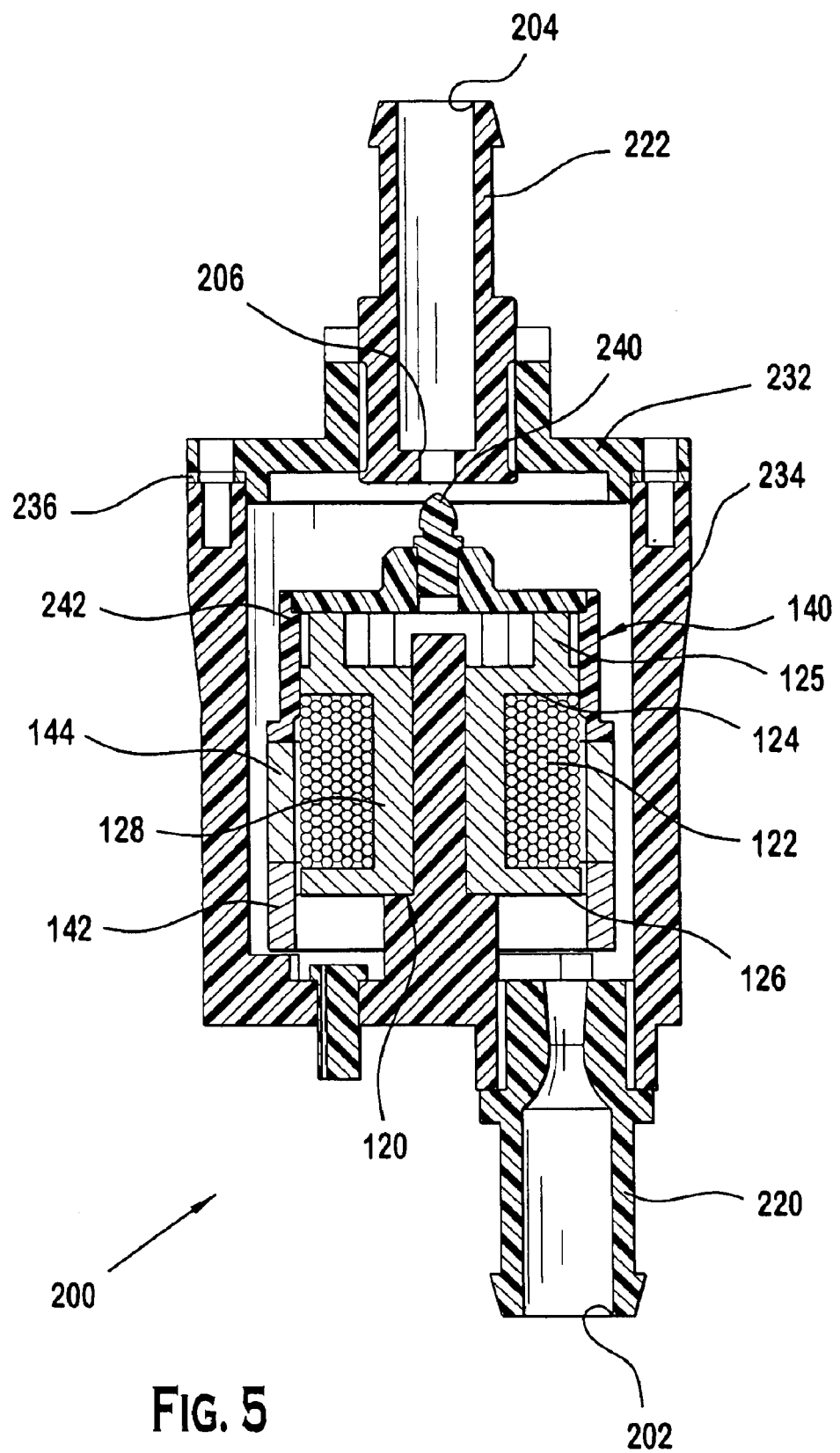
FIG. 5 is a cross sectional view of an open configuration for a preferred embodiment of the fuel vapor canister purge valve illustrated in FIG. 1.

Referring now to FIGS. 4 and 5, there is shown a preferred embodiment 200 for the fuel vapor canister purge valve 12 shown in FIG. 1. An inlet port 202 communicates fuel vapor from the fuel vapor collection canister 14. A first replaceable nozzle 220 that may, as shown in FIGS. 4 and 5, preferably have an internal cross-section profile of a sonic nozzle, defines the inlet port 202. As it is used here, the term "sonic nozzle" refers to a nozzle geometry that substantially mitigates the effect of varying pressure levels that are drawn by the vacuum source 18. Of course, other profiles are envisioned, including a straight, constant internal diameter.

The first replaceable nozzle 220 may be fitted to a housing 230 that defines the exterior of the purge valve 200. As shown in FIG. 4, the housing 230 includes a cap 232 and a body 234, to which the first replaceable nozzle 220 is fitted. A seal 236 suitable for contact with fuel vapor may be positioned between the cap 232 and the body 234 to ensure that the connection therebetween is fluid tight. The cap 234 may be fitted with a second replaceable nozzle 222 that defines an outlet port 204, which communicates fuel vapor to the vacuum source 18, and an aperture 206 through which fuel vapor passes when flowing from the inlet port 202 to the outlet port 204.

A member 240 is displaced between first and second configurations with respect to the aperture 206. The member 240 in the first configuration (as shown in FIG. 4) occludes the aperture 206 and vapor flow along the vapor flow path is substantially prevented, and the member 240 in the second configuration (as shown in FIG. 5) is spaced from the aperture 206 and vapor flow along the vapor flow path is permitted. Between the first and second configurations, changes in the vapor occur in a proportionally linear manner with respect to a control signal that is applied to the purge valve 200. Preferably, the member 240 is a pintle that is received in and occludes the aperture 206 in the first configuration.

As shown in FIGS. 4 and 5, the actuator 100 shown in FIG. 2 may be positioned in the body 234 of the housing 230. The member 240 is coupled to the armature 140 via a support 242, which displaces the member 240 from the first configuration to the second configuration. The support 242 is formed of a non-ferrous material, preferably Delrin® or Nylon®.

Referring to FIG. 4, the member 240 is maintained in the closed configuration by virtue of magnetic attraction between the permanent magnet 142 and the stator 120, e.g., the bottom washer 126. Thus, it is unnecessary to provide a resilient element, as is used in known purge valves, to bias the armature 140 toward the closed configuration. That is to say, the actuator 100 need only have the armature 140, including the permanent magnet 142, and the stator 120, including the winding 122 the purge of the member 240, to perform all of its required operations.

As it is used herein, "flow path" refers to the entirety of the passage through which fuel vapor passes through the purge valve 200. Accordingly, in the open configuration of the purge valve 200 as shown in FIG. 5, fuel vapor enters via the inlet port 202, passes through the first replaceable nozzle 220, passes along one or more flow channels between the body 234 and the armature 140, passes along one or more flow channels between the support 242 and the cap 232, passes through the space between the member 240 and the aperture 206, passes through the second replaceable nozzle 222, and exits via the second port 204.

Additionally, as shown in FIG. 5, the support 242 may come into abutting contact with one or more projections 125 from the top washer 124. This abutting relationship limits the travel of the armature 140 such that the bottom washer 126 is surrounded by the permanent magnet 142 throughout the travel of the armature 140 from the first configuration to the second configuration.

The present invention provides a number of advantages. First, the present invention provides a smaller exterior size as compared to known purge valves, particularly linear purge valves, having similar actuator force capabilities. In particular, an annular permanent magnet surrounding a stator provides very efficient use of the available magnetic forces. Second, because a purge valve according to the present invention eliminates several parts, e.g., a resilient return spring and associated calibration feature, manufacturing is simplified and the costs are reduced. Third, a purge valve according to the present invention avoids stacking-up of manufacturing tolerance variations.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A purge valve for a fuel system including an intake manifold of an internal combustion engine and a fuel tank in vapor communication with a fuel vapor collection canister, the purge valve comprising:

an aperture defining a portion of a vapor flow path extending between first and second ports, the first port communicates vapor with the fuel vapor collection canister, and the second port communicates vapor with the intake manifold;

a member being displaced between first and second configurations with respect to the aperture, the member in the first configuration occludes the aperture and vapor flow along the vapor flow path is substantially prevented, and the member in the second configuration is spaced from the aperture and vapor flow along the vapor flow path is permitted; and an actuator displacing the member between the first and second configurations, the actuator including:
a stator including a winding extending along an axis; and an armature being coupled to the member and being displaced along the axis, the armature surrounding the winding and including a permanent magnet.

2. The purge valve according to claim 1, wherein an electrical current being supplied to the winding displaces the armature along the axis, which displaces the member toward the second configuration.

3. The purge valve according to claim 1, wherein at least one of the first and second ports comprises a sonic nozzle.

4. The purge valve according to claim 1, wherein the member comprises a pintle that is received in and occludes the aperture in the first configuration.

5. The purge valve according to claim 1, wherein the vapor flow path extends from the first port, around the stator and the armature, through the aperture when the member is in the second configuration, to the second port.

6. The purge valve according to claim 1, wherein the actuator comprises a housing that is relatively fixed with respect to the stator.

7. The purge valve according to claim 6, wherein the member in the first configuration is magnetically attracted to the stator.

8. The purge valve according to claim 7, wherein the actuator consists essentially of the armature including the permanent magnet and the stator including the winding.

9. The purge valve according to claim 6, wherein the housing defines at least one of the aperture, the first port, and the second port.

10. The purge valve according to claim 1, wherein the permanent magnet is mechanically coupled to the member.

11. The purge valve according to claim 10, wherein a non-ferrous support couples the permanent magnet to the member.

12. The purge valve according to claim 1, wherein the stator comprises a ferrous bobbin extending along the axis between first and second flanges.

13. The purge valve according to claim 12, wherein the ferrous bobbin comprises a shell extending along the axis between the first and second flanges, and the winding is positioned around the shell.

14. The purge valve according to claim 13, wherein the permanent magnet surrounds the first flange.

15. The purge valve according to claim 13, wherein the armature comprises a ferrous armature piece located between the member and the permanent magnet, the ferrous armature piece surrounds the winding.

16. The purge valve according to claim 13, wherein the armature comprises a non-ferrous support coupling the ferrous armature piece to the member.

17. The purge valve according to claim 12, wherein the second flange comprises at least one projection abutting the armature when the member is in the second configuration.

* * * * *

UNITED STATES PATENT AND TRADEMARK OFFICE
CERTIFICATE OF CORRECTION

PATENT NO. : 6,941,934 B2
DATED : September 13, 2005
INVENTOR(S) : Craig Andrew Weldon et al.

It is certified that error appears in the above-identified patent and that said Letters Patent is hereby corrected as shown below:

<u>Title page,</u>
Item [75], Inventors, delete "Giles R. Amirault" and replace with
-- Gilles R. Amirauit --.

Signed and Sealed this

Eighteenth Day of April, 2006

JON W. DUDAS
*Director of the United States Patent and Trademark Office*